United States Patent
Park

(10) Patent No.: US 10,409,936 B2
(45) Date of Patent: Sep. 10, 2019

(54) METHOD AND APPARATUS FOR MODELLING POWER CONSUMPTION OF INTEGRATED CIRCUIT

(71) Applicant: Samsung Electronics Co., Ltd., Gyeonggi-do (KR)

(72) Inventor: Jihwan Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 771 days.

(21) Appl. No.: 14/420,303

(22) PCT Filed: Aug. 8, 2013

(86) PCT No.: PCT/KR2013/007150
§ 371 (c)(1),
(2) Date: Feb. 6, 2015

(87) PCT Pub. No.: WO2014/025212
PCT Pub. Date: Feb. 13, 2014

(65) Prior Publication Data
US 2015/0220672 A1   Aug. 6, 2015

(30) Foreign Application Priority Data
Aug. 8, 2012 (KR) .................. 10-2012-0086647

(51) Int. Cl.
*G06F 17/50* (2006.01)
*G06F 1/3237* (2019.01)
*G06F 17/10* (2006.01)

(52) U.S. Cl.
CPC ........ *G06F 17/5036* (2013.01); *G06F 1/3237* (2013.01); *G06F 17/10* (2013.01);
(Continued)

(58) Field of Classification Search
CPC .. G06F 17/5036; G06F 17/10; G06F 17/5022; G06F 1/3237; G06F 2217/78; Y02B 60/1221; Y02D 10/128
(Continued)

(56) References Cited

U.S. PATENT DOCUMENTS 5,625,803 A * 4/1997 McNelly ............. G06F 17/5022
703/14
7,323,909 B2 1/2008 Mamidipaka
(Continued)

FOREIGN PATENT DOCUMENTS

| EP | 2610702 A2 | 7/2013 |
|---|---|---|
| KR | 10-2009-0114773 | 11/2009 |
| KR | 10-2011-0113551 | 10/2011 |

OTHER PUBLICATIONS

"The First Office Action," Chinese Patent Application No. 201380042239.9, dated Sep. 7, 2016, 6 pages.
(Continued)

*Primary Examiner* — Eunhee Kim

(57) ABSTRACT

A method of modeling power consumption of an integrated circuit and an apparatus for supporting the same are provided. The method of modeling power consumption of an integrated circuit includes: grasping information about a clock gating enable signal of the integrated circuit; determining a modeling level using a change rate of the number of the clock enable signal; and extracting a power state according to the modeling level and the number of the clock gating enable signal and modeling power consumption in the power state. Thereby, because a power state can be defined with only the number of a clock gating enable signal, a dynamic power consumption amount can be quickly and accurately estimated.

14 Claims, 12 Drawing Sheets

(52) U.S. Cl.
CPC ...... *G06F 17/5022* (2013.01); *G06F 2217/78* (2013.01); *Y02D 10/128* (2018.01)

(58) Field of Classification Search
USPC .................................................. 703/2, 18, 19
See application file for complete search history.

(56) References Cited

U.S. PATENT DOCUMENTS

| | | | |
|---|---|---|---|
| 7,562,325 | B1 | 7/2009 | Arbel et al. |
| 2006/0277509 | A1 | 12/2006 | Tung et al. |
| 2007/0157130 | A1 | 7/2007 | Eisner et al. |
| 2008/0127001 | A1* | 5/2008 | Tamaki ............... G06F 17/5036 716/108 |
| 2009/0259869 | A1* | 10/2009 | Naffziger .................. G06F 1/26 713/340 |

OTHER PUBLICATIONS

Extended European Search Report dated Apr. 13, 2016 in connection with European Application No. 13828003.7, 15 pages.
Renu Mehra, "Commercial Low-Power EDA Tools: A Review", Proceedings of the ACM International Symposium on Low Power Electronics and Design, Jul. 30-Aug. 1, 2012, Redondo Beach, California, 5 pages.
Apache Design Inc., "Advancing Low-Power Innovation Analysis-Driven Automatic RTL Power Reduction Automatic Power Reduction RTL Power Accuracy Power Debug Cockpit Power Regression Database Earch Power Prototyping", Dec. 31, 2011, XP055259353, URL:https://www.apache-da.com/system/files/datasheet-PowerArtist-web.pdf, 4 pages.
International Search Report dated Dec. 10, 2013 in connection with International Patent Application No. PCT/KR2013/007150, 3 pages.
Written Opinion of International Searching Authority dated Dec. 10, 2013 in connection with International Patent Application No. PCT/KR2013/007150, 4 pages.

* cited by examiner

[Fig. 3]
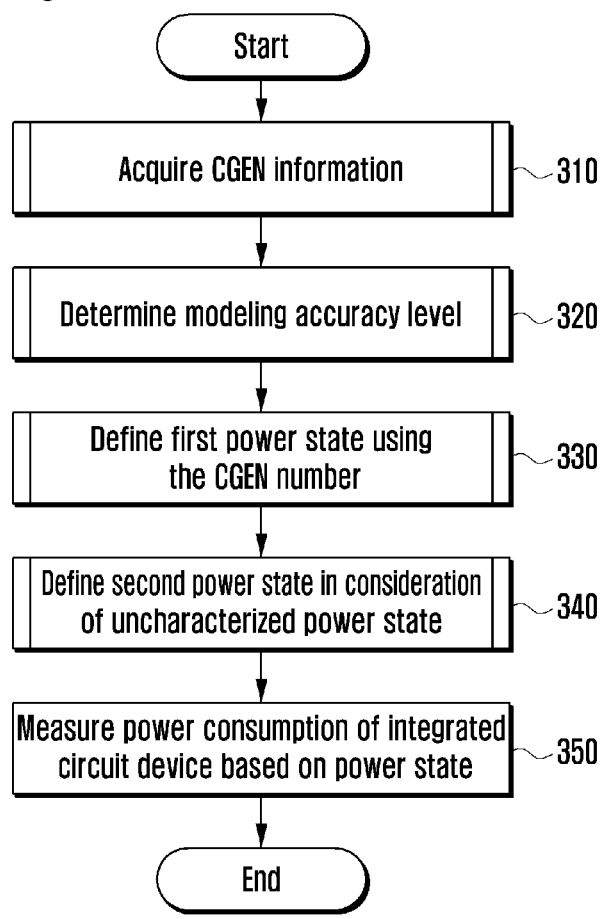

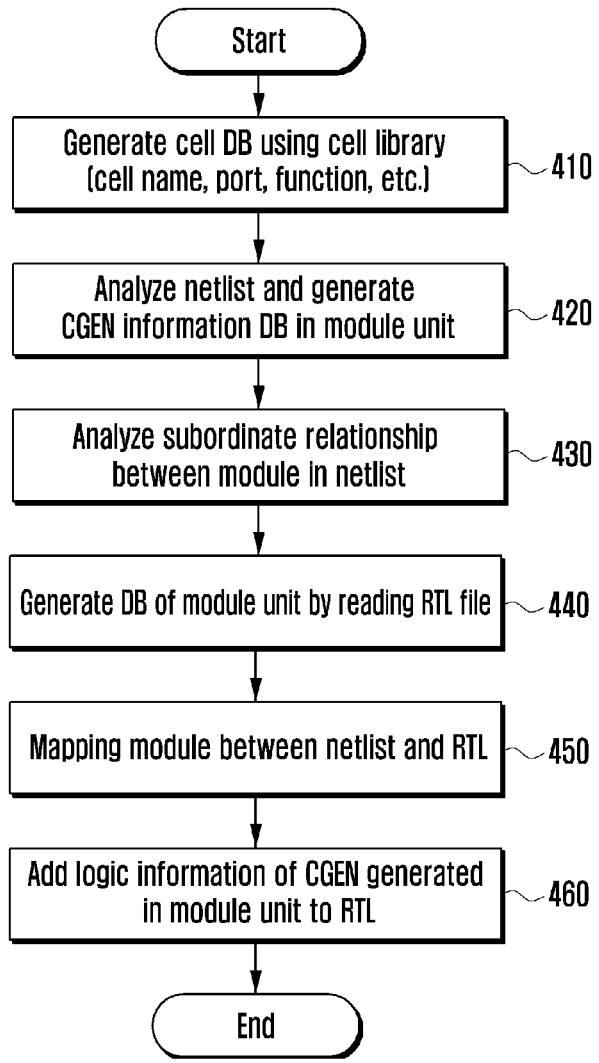
[Fig. 4]

[Fig. 5]
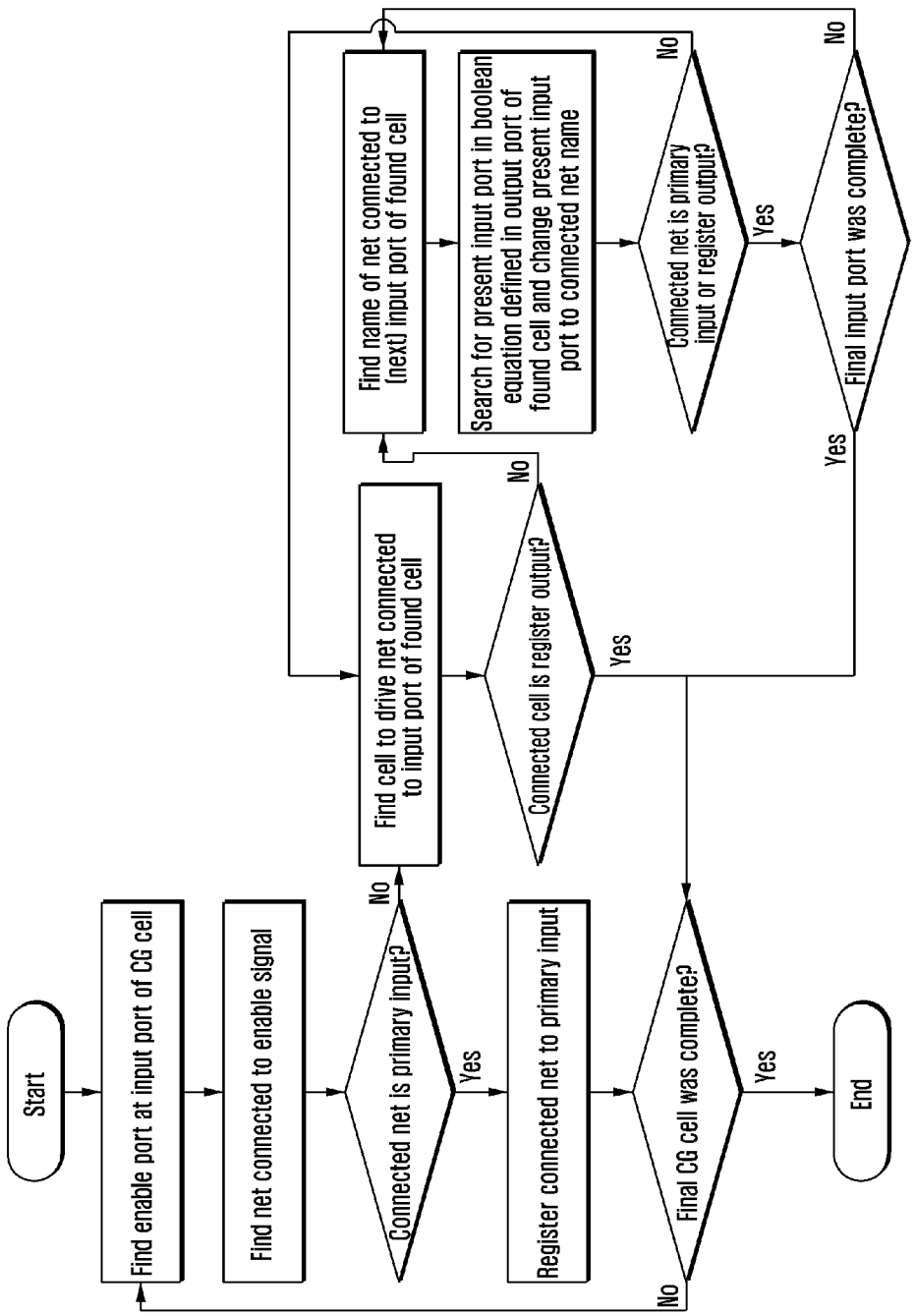

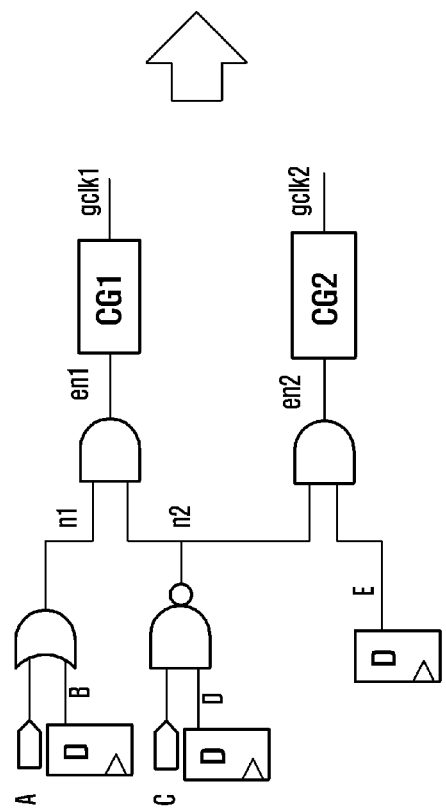
[Fig. 6]

[Fig. 7]

| Clock gating domain | CGD1 | CGD2 | CGD3 | CGD4 | Set of consumption powers (P) |
|---|---|---|---|---|---|
| Set of driving signals (EN) | en1 | en2 | en3 | en4 | |
| ps1 | 0 | 0 | 0 | 0 | P1 |
| ps2 | 0 | 0 | 0 | 1 | P2 |
| ps3 | 0 | 0 | 1 | 0 | P3 |
| ps4 | 0 | 0 | 1 | 1 | P4 |
| ps5 | 0 | 1 | 0 | 0 | P5 |
| ... | | | | | |
| ps16 | 1 | 1 | 1 | 1 | P16 |

Problem: If the CGEN number is N, existable power state is $2^N$

[Fig. 8]
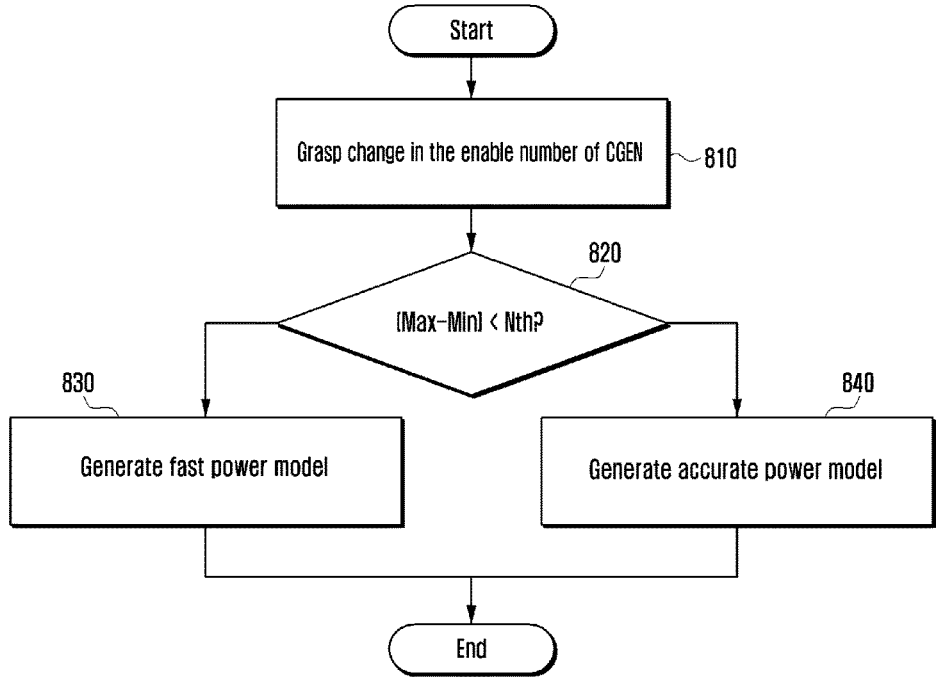
[Fig. 9]
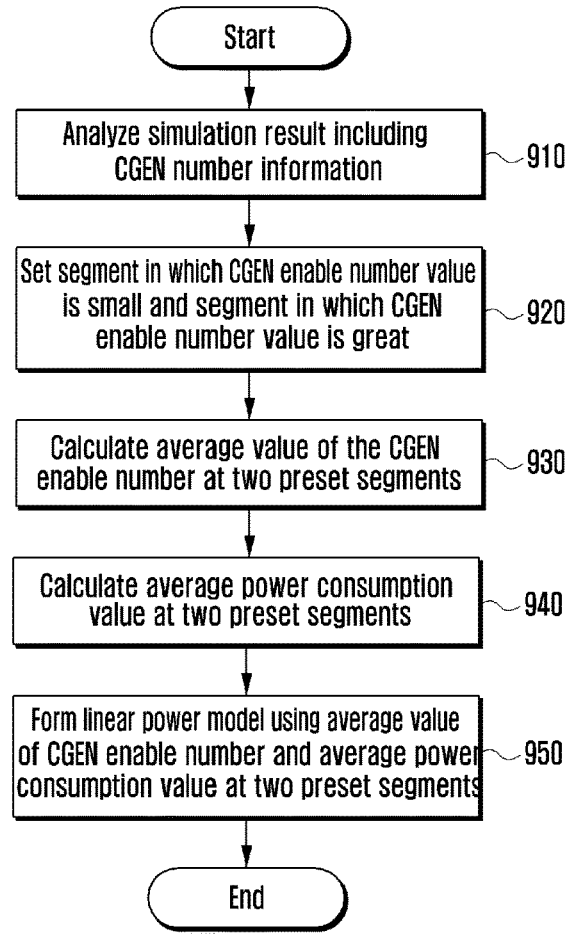

[Fig. 10]
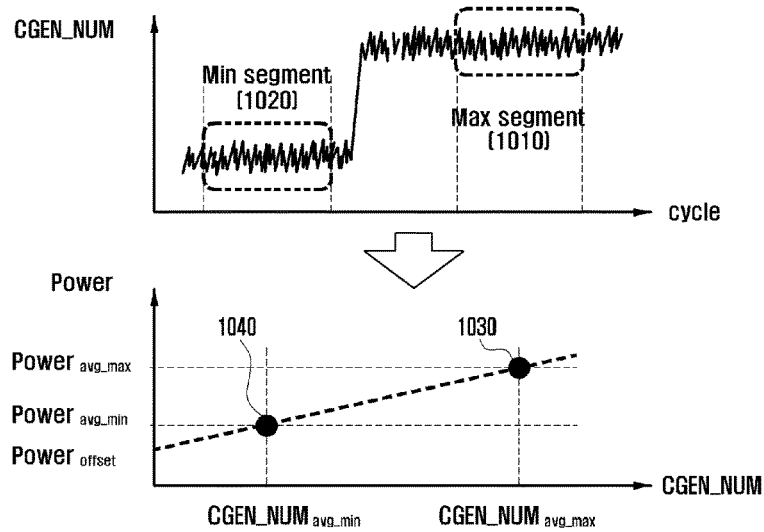
[Fig. 11]
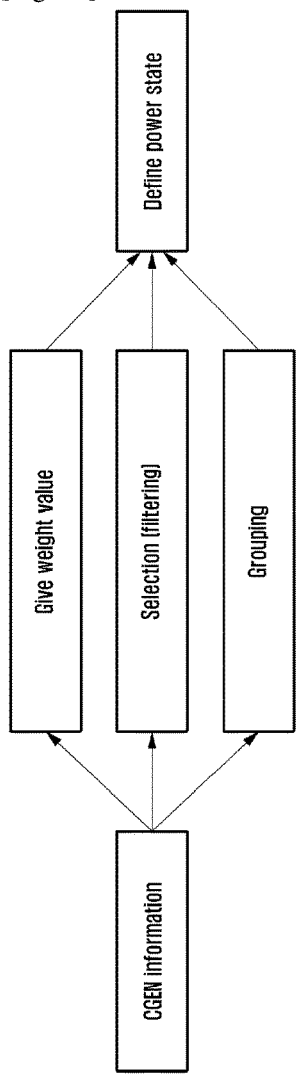

[Fig. 12]
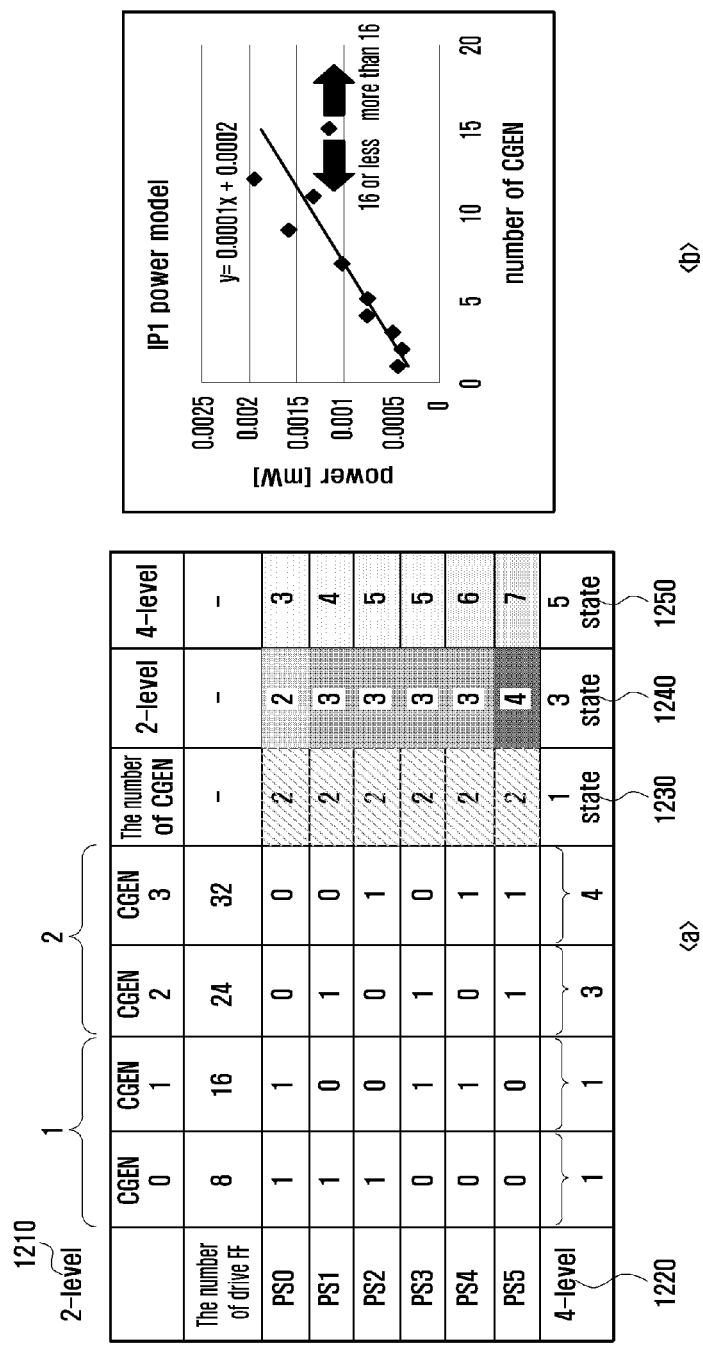

[Fig. 13]
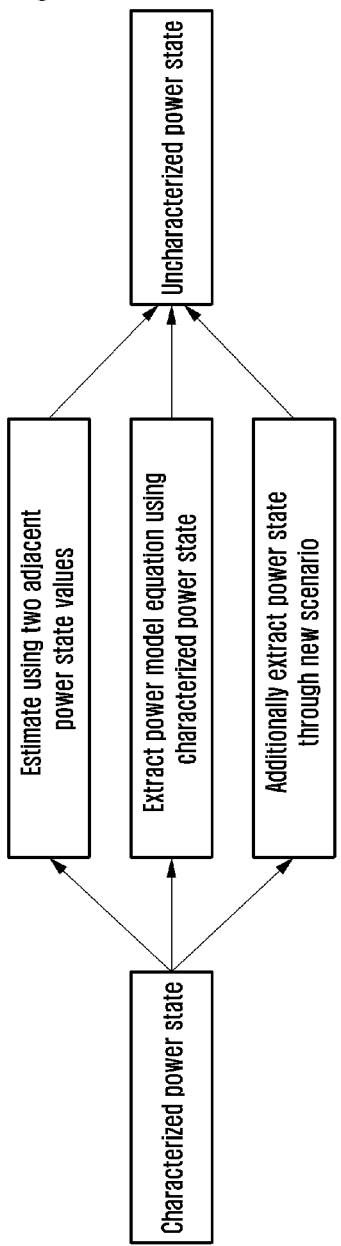

[Fig. 14]
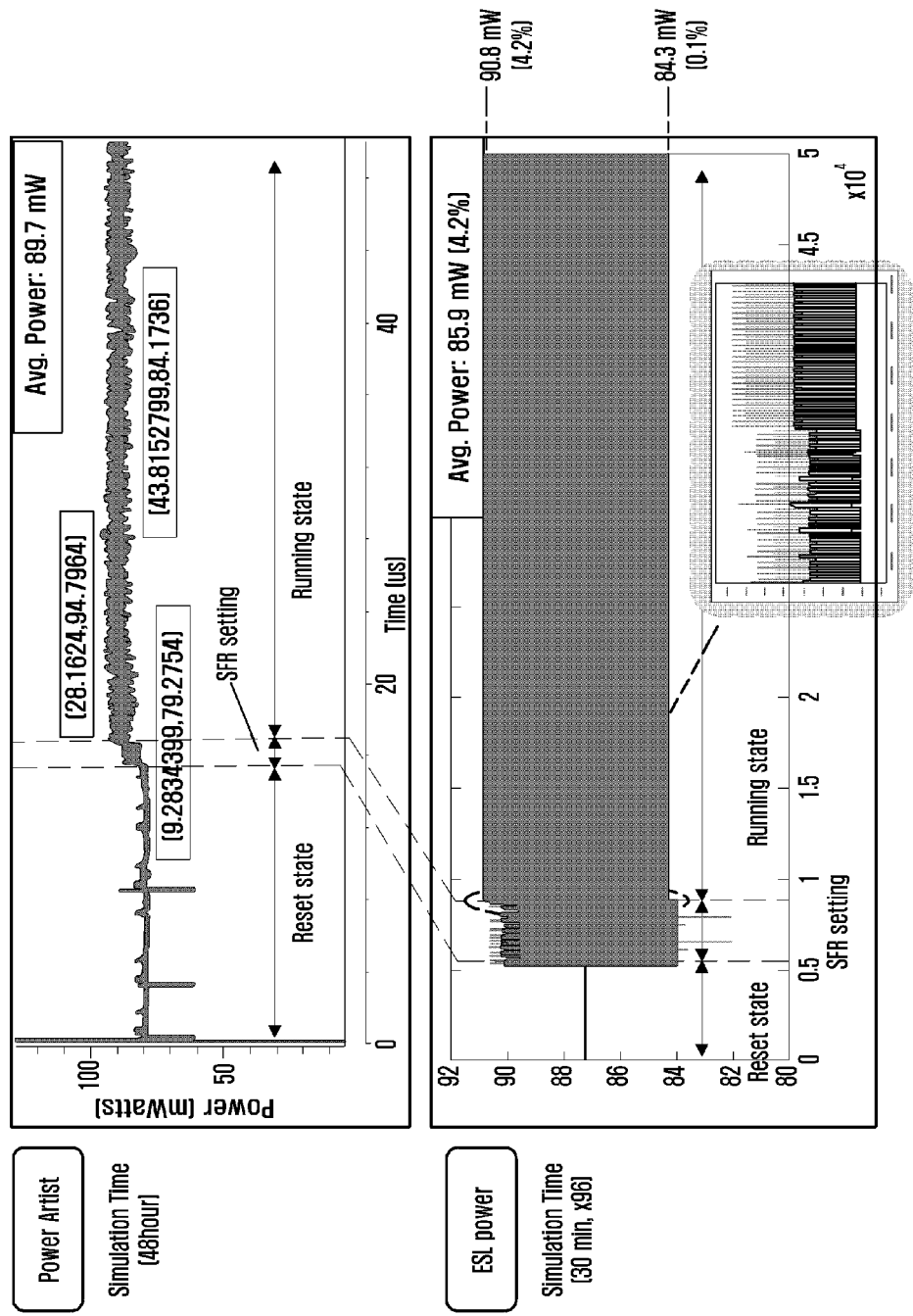

[Fig. 15]
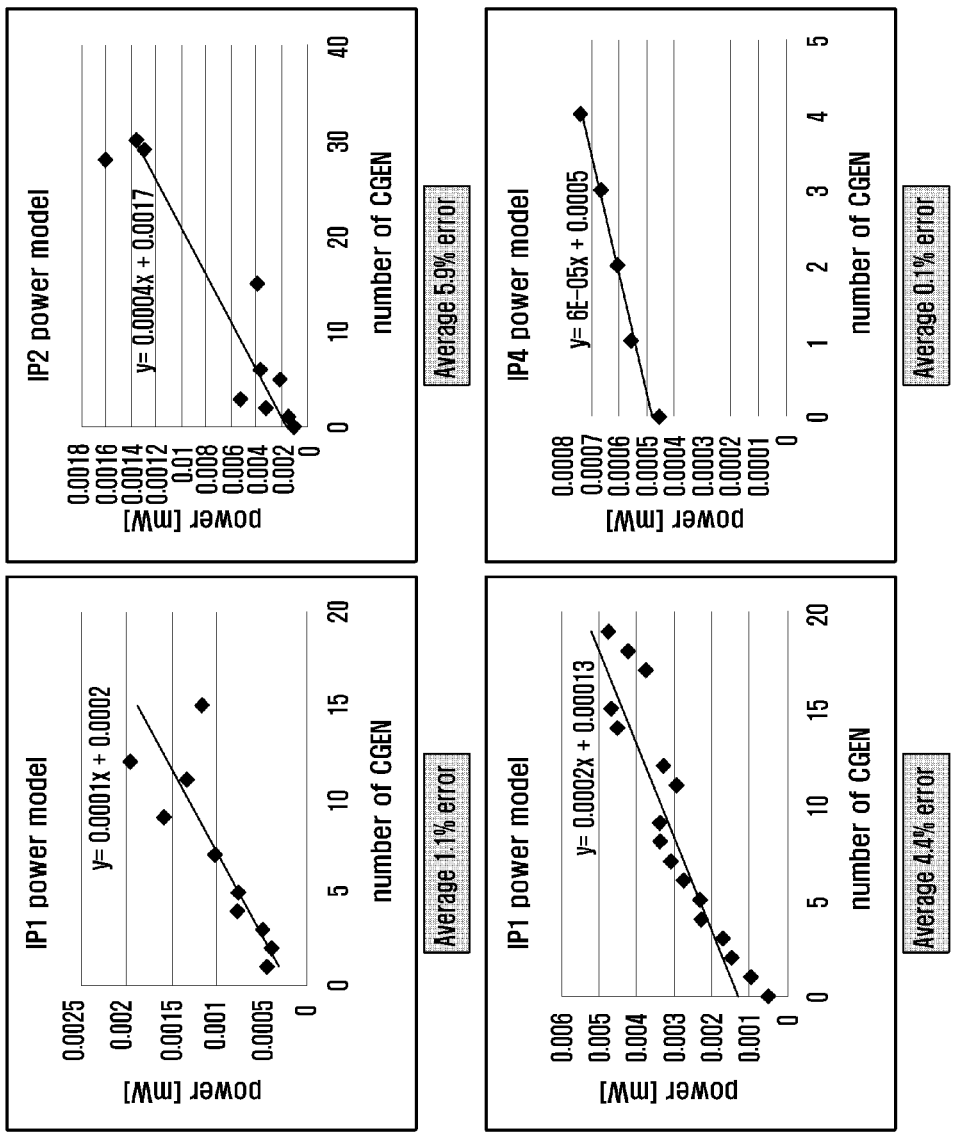

METHOD AND APPARATUS FOR MODELLING POWER CONSUMPTION OF INTEGRATED CIRCUIT

CROSS-REFERENCE TO RELATED APPLICATION(S)

The present application claims priority under 35 U.S.C. § 365 to International Patent Application No. PCT/KR2013/007150 filed Aug. 8, 2013, entitled "METHOD AND APPARATUS FOR MODELLING POWER CONSUMPTION OF INTEGRATED CIRCUIT". International Patent Application No. PCT/KR2013/007150 claims priority under 35 U.S.C. § 365 and/or 35 U.S.C. § 119(a) to Korean Patent Application No. 10-2012-0086647 filed Aug. 8, 2012 and which are incorporated herein by reference into the present disclosure as if fully set forth herein.

TECHNICAL FIELD

This disclosure relates to an integrated circuit, and more particularly, to a method of estimating power consumption of an integrated circuit device and an apparatus to support the same.

BACKGROUND ART

Nowadays, while technology related to mobile devices develops, the mobile devices are formed in a small size and a light weight. In order to form such a mobile device in a small size, it is essential that a battery has a large quantity and an integrated circuit device forming a mobile device consumes low power.

In order for the integrated circuit device to consume low power, when driving an integrated circuit, by grasping an element that wastes power, it is necessary to minimize waste power. By finding the wasted element, in order for the integrated circuit device to consume low power, a process of estimating a power consumption amount according to a user scenario is preceded.

In order to describe a power consumption amount estimation process of the integrated circuit device, an integrated circuit development operation is roughly described. An integrated circuit is designed via an architecture design of the integrated circuit, a register transfer level (RTL) design that subdivides the architecture on a block basis, a gate design and a logic circuit design, a block disposition design, a layout design, and a simulation process of performing timing and power wiring simulation. In this case, when a low power design is available through accurate power consumption analysis at an architecture design operation, which an initial operation of integrated circuit development, a maximum effect can be expected with a minimum cost.

In order to describe a power consumption amount estimation process of the integrated circuit device, a module of constituting the integrated circuit device is roughly described. The integrated circuit device may be defined as a module based on a gate level, a register transfer level, or an electronic system level. In this case, in a system level, it is effective to perform power consumption analysis from a simulation speed viewpoint. However, there was a problem that technology of analyzing power consumption in a conventional system level deteriorates accuracy when depending on a developer's experience and comprehension on operation of an integrated circuit and extends a modeling generation time.

DISCLOSURE OF INVENTION

Technical Problem

This disclosure has been made in view of the above problems, and may provide a method of estimating a dynamic power consumption amount with high accuracy in a short time with dynamic power of an integrated circuit.

Solution to Problem

In accordance with an aspect of this disclosure, a method of modeling power consumption of an integrated circuit includes: grasping information about a clock gating enable signal of the integrated circuit; determining a modeling level using a change rate of the number of the clock gating enable signal; and extracting a power state according to the modeling level and the number of the clock gating enable signal and modeling power consumption in the power state.

In accordance with another aspect of this disclosure, a power consumption modeling apparatus of an integrated circuit includes: a signal extracting unit that grasps information about a clock gating enable signal of the integrated circuit; a modeling unit that determines a modeling level using a change rate of the number of the clock gating enable signal and that models power consumption on a power state extracted by a power state defining unit; and the power state defining unit that extracts a power state according to the modeling level and the number of the clock gating enable signal.

Advantageous Effects of Invention

According to this disclosure, because a power state can be defined with only the number of a clock gating enable signal, a dynamic power consumption amount can be quickly and accurately estimated. Further, according to this disclosure, because a requested modeling level can be previously determined according to a scenario, accuracy according to a situation can be provided.

BRIEF DESCRIPTION OF DRAWINGS

FIG. 3 is a flowchart illustrating a power consumption modeling method of an integrated circuit according to an exemplary embodiment of this disclosure;

FIG. 4 is a flowchart illustrating operation 310 of FIG. 3 of acquiring clock gating enable (CGEN) information;

FIG. 5 is a flowchart illustrating operation 420 of FIG. 4;

FIG. 6 is a diagram illustrating an exemplary embodiment of extracting a logic cone constituting an enable signal of a clock gating (CG) cell;

FIG. 7 is a table illustrating a problem when defining a power state with a set of the number of cases of a CGEN signal;

FIG. 8 is a flowchart illustrating operation 320 of FIG. 3 of determining a modeling level;

FIG. 9 is a flowchart illustrating an exemplary embodiment of generating a fast power model;

FIG. 10 is a graph illustrating a simulation result of a fast power model;

FIG. 11 is a block diagram illustrating operation 330 of FIG. 3 of defining a power state according to the CGEN number;

FIG. 12 is a diagram illustrating a method of defining a power state by giving a weight value according to an exemplary embodiment of this disclosure;

FIG. 13 is a block diagram illustrating a method of generating a power model in an uncharacterized power state (second power state) using a characterized power state (first power state);

FIG. 14 is a graph comparing a result that generates a power model according to an exemplary embodiment of this disclosure and a result that generates a power model using a conventional use tool; and FIG. 15 is a graph comparing a result that generates a power model by defining a power state with the number of CGEN according to an exemplary embodiment of this disclosure and a result that generates a power model by defining a power state with a combination of the number of cases of a signal of CGEN in the conventional art.

MODE FOR THE INVENTION

Figure 1:
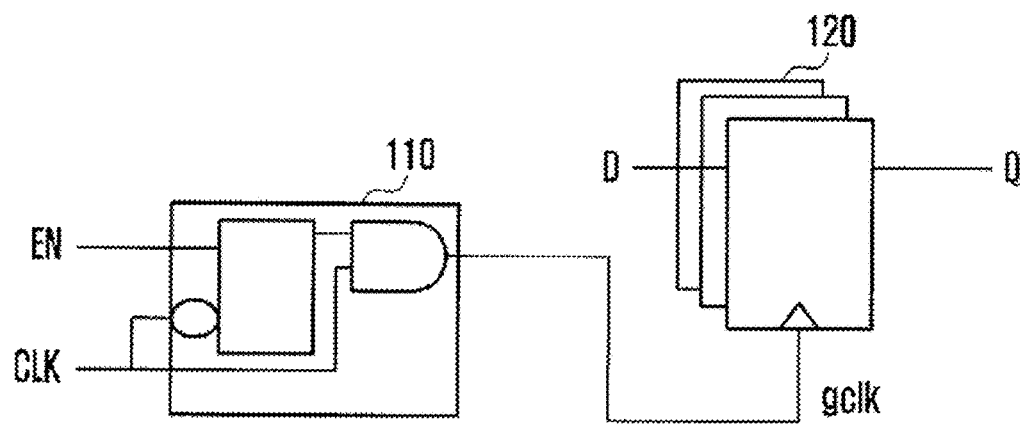
FIG. 1 is a diagram illustrating a clock gating structure in a digital system.

Hereinafter, exemplary embodiments of this disclosure are described in detail with reference to the accompanying drawings. The same reference numbers are used throughout the drawings to refer to the same or like parts. The views in the drawings are schematic views only, and are not intended to be to scale or correctly proportioned. Detailed descriptions of well-known functions and structures incorporated herein may be omitted to avoid obscuring the subject matter of this disclosure.

Power consumption of an integrated circuit is formed with static power and dynamic power, and when supplied power is not gated, it is characterized that a static power consumption amount does little change. Therefore, when estimating power consumption in a system level, dynamic power consumption estimation may become the most important variable.

Most dynamic power consumption may be consumed by a supplied clock. This is because in a modern digital system, power of 50% or more is consumed by clock buffer. In this case, in order to reduce consumption power by a uselessly wasted clock, clock gating technology may be universally used. Accordingly, dynamic power consumption may have a close correlation with operation of a clock gating signal.

In order to help comprehension of this disclosure, a clock gating operation is simply described. Clock gating is technology that minimizes wasted power by stopping clock supply of a logic circuit that does not have a change in an output value by controlling a gate that supplies a clock. Accordingly, for example, in a situation in which an electronic device does not use a camera module, by intercepting clock supply of a CPU block related to the camera module, power waste generating in a CPU block that does not use can be reduced.

FIG. 1 is a diagram illustrating a clock gating structure in a digital system. Here, a clock gating cell 110 may output a gated clock (gclk).

The clock gating cell 110 may logically combine a clock signal (CLK) and a clock gating enable signal (EN), activate the gclk at a segment in which the EN is activated, and supply the enabled gclk to a clock gating domain 120. Therefore, the clock gating domain 120 may be driven by the gclk.

Although not shown in FIG. 1, the EN may be generated in a logic cone of a front end portion of the clock gating cell 110. Here, the logic cone may perform a function of controlling a clock gating enable signal in response to an input signal.

The clock gating cell 110 may perform a function of stopping or resuming a clock supply of the clock gating domain 120 in response to an enable signal generated by the logic cone.

In other words, the clock gating cell 110 may gate a CLK and an EN, supply the CLK and the EN to the clock gating domain 120, and enable or disable the clock, as needed, thereby adjusting operation of the clock gating domain 120. Accordingly, by removing unnecessary power consumed in an idle unit, power of an entire system can be saved.

For example, when the clock gating cell 110 stops an output of a gated clock, the clock gating domain 120 may stop operation and thus dynamic power consumption can be prevented. When the clock gating cell 110 resumes an output of a gclk, the clock gating domain 120 may resume operation and perform data transmission between internal registers and thus dynamic power consumption may occur.

In this method, a clock gating signal may perform a function of controlling dynamic power consumption, and power consumption of an integrated circuit device may change according to an enable or disable state of a clock gating signal. Here, this disclosure may provide a method of estimating power consumption with a clock gating enable signal.

Figure 2:
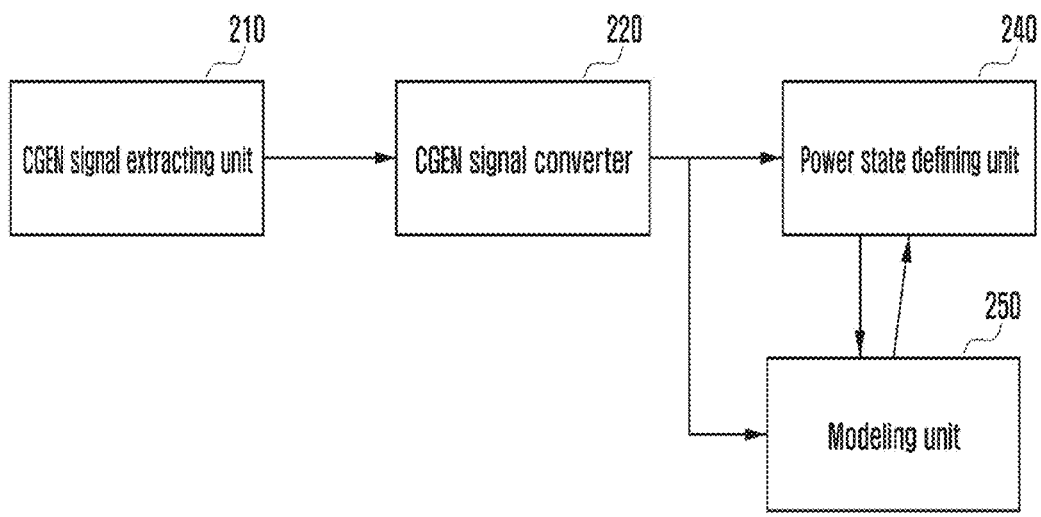
FIG. 2 is a block diagram illustrating a configuration of a power consumption modeling apparatus of an integrated circuit according to an exemplary embodiment of this disclosure.

FIG. 2 is a block diagram illustrating a configuration of a power consumption modeling apparatus of an integrated circuit according to an exemplary embodiment of this disclosure.

Referring to FIG. 2, a consumption modeling estimating apparatus according to an exemplary embodiment of this disclosure may include a clock gating enable (CGEN) signal extracting unit 210, CGEN signal converter 220, power state defining unit 240, and modeling unit 250.

The CGEN signal extracting unit 210 may find a clock gating cell in a netlist, extract a CGEN signal, and perform a function of reconfiguring a logic cone that generates the CGEN signal with a boolean method. More specifically, the CGEN signal extracting unit 210 may detect a portion in which a clock gating cell is defined in a netlist of a gate level and track an output signal of the clock gating cell, thereby generating information about a clock gating enable signal.

The CGEN signal converter 220 may perform a function of enabling a user to view a CGEN signal within a circuit with only an output signal by adding CGEN information generated in the CGEN signal extracting unit 210 to an RTL. Further, the CGEN signal converter 220 may perform a function of converting the RTL to which CGEN information is added to a C-model to use in a system level.

The power state defining unit 240 may define a power state using a CGEN signal and extracts a power value. Particularly, according to the present exemplary embodiment, it is characterized that the power state defining unit 240 may define a power state using the number of CGEN signals as a variable instead of a set of the number of cases of a CGEN signal.

The modeling unit 250 may perform modeling by connecting a C-model extracted from the CGEN signal converter 220 to a power value in which the power state defining unit 240 extracts. More specifically, the modeling unit 250 may determine an accuracy level of modeling according to a change of the CGEN number, transfer the accuracy level to the power state defining unit 240, and define a second power state that can include an uncharacterized power state other than a first power state in which the power state defining unit 240 defines.

FIG. 3 is a flowchart illustrating a power consumption modeling method of an integrated circuit according to an exemplary embodiment of this disclosure.

The CGEN signal extracting unit 210 and the CGEN signal converter 220 may acquire CGEN information and generate a database (310). An illustration of operation 310 is shown in FIGS. 4 to 6.

FIG. 4 is a flowchart illustrating operation 310 of FIG. 3 of acquiring CGEN information.

The CGEN signal extracting unit 210 may generate cell information of a cell library used for a netlist composition in the RTL as a DB (410).

The DB may include information about a cell name, an input and output port of a cell, and a function of a cell.

The CGEN signal extracting unit 210 may analyze the netlist and generate connection information between cells in a DB in a module unit, particularly, may extract logic cone information that controls a CGEN signal with a boolean method (420).

The CGEN signal converter 220 may structurally analyze module information on the netlist (430).

The CGEN signal converter 220 may perform a mapping work through RTL file analysis (440 to 450).

More specifically, the CGEN signal converter 220 may connect a netlist and RTL DB information in a module unit, add a logic cone constituting a CGEN signal of a module unit extracted from the netlist into the RTL (460), and connect the logic cone to an output port, thereby performing a mapping work.

FIG. 5 is a flowchart illustrating operation 420 of FIG. 4.

According to an exemplary embodiment of this disclosure, information of a CGEN signal and a logic cone that controls the CGEN signal on the netlist may be extracted through a method shown in FIG. 5.

Referring to FIG. 5, the CGEN signal extracting unit 210 extracts a logic cone constituting an enable signal by finding a clock gating (CG) cell in a module unit until finding an output signal of flip-flop or a primary input port and replaces and reconfigures a signal on the netlist to a signal existing on the RTL.

FIG. 6 is a diagram illustrating an exemplary embodiment of extracting a logic cone constituting an enable signal of a CG cell.

In FIG. 6, the number of CG cells existing in each module unit determines a size of CGEN, and a combination circuit generating a CGEN signal forms a Boolean equation of a cell unit using an input signal. Therefore, a combination circuit of a reconfigured CGEN signal is formed with a signal existing at the RTL and newly generated information and thus may be added to the RTL like information formed in a netlist.

Referring again to FIG. 3, the modeling unit 250 may determine a modeling accuracy level (320) and a detailed description thereof is shown in FIG. 8. Further, the power state defining unit 240 may define a first power state using the CGEN number (330), and the modeling unit 250 and the power state defining unit 240 may define a second power state including a power state undefined in a first power state (340).

As described above, in this disclosure, it is characterized that a power state is defined using the number of CGEN signals, not a set of the number of cases of a CGEN signal as a variable.

In order to help comprehension of this disclosure, unlike this disclosure, a problem of a method of defining a power state with a set of the number of cases of a CGEN signal is described.

FIG. 7 is a diagram illustrating a problem when defining a power state with a set of the number of cases of a CGEN signal.

As shown in FIG. 7, when four CGEN signals exist, the number of cases of each signal may be 24, and 16 power states may exist. Further, for the n number of CGEN signals, a power state of the number of 2n should be considered. In this case, a problem that a time consumed for generating modeling may be greater than a SoC development time may occur.

For example, in an integrated circuit including 500,000-10 million gates, when clock gating of 80-90% is applied, 1,000-2,000 clock gating enable signals may be generated. In this case, because power states of 21000 or more theoretically exist, a problem that much time is consumed for modeling may occur.

Nowadays, because a size of SoC continuously increases, SoC may generally support 10 million or more, and when it is considered that a mobile AP supports 100 million gates to 200 million gates, a method of defining a power state with a set of the number of cases of a CGEN signal may have a problem that industrial applicability is rare.

However, according to an exemplary embodiment of this disclosure, a power state may be defined with only the number of CGEN signals. In an illustration of FIG. 7, when (en1, en2, en3, en4) is (0, 0, 0, 0), a CGEN signal is 0 and may be defined to a power state 0 according to this disclosure. Further, when (en1, en2, en3, en4) is (0, 0, 0, 1), (0, 0, 1, 0), (0, 1, 0, 0), and (1, 0, 0, 0), a CGEN signal may be 1 and be defined to a power state 1 according to this disclosure.

Similarly, when (en1, en2, en3, en4) is (1, 1, 0, 0), (1, 0, 1, 0), (1, 0, 0, 1), (0, 1, 1, 0), (0, 1, 0, 1), and (0, 0, 1, 1), a CGEN signal may be 2 and be defined to a power state 2 according to this disclosure. Further, when (en1, en2, en3, en4) is (1, 1, 1, 0), (1, 1, 0, 1), (1, 0, 1, 1), and (0, 1, 1, 1), a CGEN signal may be 3 and be defined to a power state 3 according to this disclosure, and when (en1, en2, en3, en4) is (1, 1, 1, 1), a CGEN signal may be 4 and be defined to a power state 4 according to this disclosure.

In other words, in a conventional method, because a power state is defined with a set of the number of cases of a CGEN signal, when the number N of clock gating signals increases, a power state may increase by geometric progression 2N and thus a problem that much time is consumed for modeling generation may occur.

However, according to this disclosure, because a power state is defined with only the number of CGEN signals, a modeling time may remarkably decrease. Further, according to this disclosure, because a requested modeling level may be previously determined according to a scenario, accuracy can be provided according to a situation.

FIG. 8 is a flowchart illustrating operation 320 of FIG. 3 of determining a modeling level.

When a modeling level is previously determined and a power model is generated, an unnecessary modeling time can be shortened. In this disclosure, a method of determining a modeling level using a change amount of an enabled signal in clock gating signals may be suggested.

According to this disclosure, as the number of enabled signals in clock gating signals increases, a fast power model that can shorten a modeling time may be generated even with low accuracy using a characteristic in which consumption power increases. When a power model having high accuracy is requested, even if a modeling time is extended, an accurate power model may be generated.

When a change in the enable number of a clock gating signal is not large in a simulation, even if power consumption is defined in an idle state and an active state, accuracy has no large influence, and when a change of the enable number is few in operation, a power model may not require an accurate power model.

Therefore, a level of a power model may be determined through a method of FIG. 8.

The modeling unit 250 determines the number of enable signals in clock enable signals based on CGEN information generated at operation 310 (810).

The modeling unit 250 determines whether a change amount is greater or smaller than a reference in which a user previously defines by analyzing the number of clock gating enable signals in a predetermined time unit (820).

If a change amount is smaller than a reference in which a user previously defines, a fast power model may be generated (830), and if a change amount is greater than a reference in which a user previously defines, an accurate power model may be generated (840).

FIG. 9 is a diagram illustrating an exemplary embodiment in which the power state defining unit 240 generates a fast power model when the modeling unit 250 determines a modeling level to a fast power model (830).

The power state defining unit 240 simulates the CGEN number on a segment basis (910).

FIG. 10A is a graph illustrating a simulation result of operation 910.

As shown in FIG. 10A, the number of (x-axis) CGEN may be grasped based on each cycle according to this disclosure.

In order to grasp a change of the enable number of a clock gating signal, the power state defining unit 240 may set a segment having the many enable number and a segment having the small enable number in an enabled clock gating signal in a simulation result (920).

Such division may be set to for example, a max segment 1010 and a min segment 1020, as shown in FIG. 10A. At the max segment 1010 of FIG. 10A, because a change of the number of CGEN signals is not large, it is assumed that power consumption is performed in an active state, and at a min segment 1020, because a change of the number of CGEN signals is not large, it is assumed that power consumption is performed in an idle state.

The power state defining unit 240 may calculate an average value of the number of CGEN signals at two preset segments (930).

The power state defining unit 240 may calculate an average power consumption value at two preset segments (940) and may form a linear power model (950).

An exemplary embodiment of operations 930 and 950 is shown in FIG. 10B. As shown in FIG. 10B, an average value of the number of CGEN signals of a max segment and an average power consumption value of a max segment are shown in 1030. An average value of the number of CGEN signals of a min segment and an average power consumption value of a min segment are shown in 1040.

When linearly calculating a power value of the remaining segment using 1030 and 1040, a fast power model that can shorten a modeling time even with low accuracy may be generated. In this case, when measurement values of two segments set necessary for forming a fast power model are entirely formed, by forming a linear power model with the following equation, a relatively accurate power model may be briefly formed.

$$Power = \left( \frac{Power_{avg\_max} - Power_{avg\_min}}{CGEN\_NUM_{avg\_max} - CGEN\_NUM_{avg\_min}} \right) * CGEN\_NUM + Power_{offset}$$

However, a method of generating an accurate power model may form a power model by measuring a power value of each power state defined with the enable number of a CGEN signal.

Referring again to FIG. 3, the power state defining unit 240 may define a first power state using the CGEN number (330). Particularly, when the modeling unit 250 sets a modeling level to an accurate power model at operation 320, the power state defining unit 240 may define a power state with the enable number of a CGEN signal (330).

FIG. 11 is a block diagram illustrating operation 330 of FIG. 3 of defining a power state according to the CGEN number.

A method of defining a power state using CGEN information may be illustrated with giving of a weight value, selection (filtering), and grouping, as shown in FIG. 11. Accuracy of a power state can be improved through such a method, and particularly, a method of giving a weight value is described later with reference to FIG. 12.

First, a method of giving a weight value may be embodied by giving a weight value according to a size of a circuit by analyzing the size of the circuit in which a CG cell drives. When a power state is defined with the enable number of CGEN according to this disclosure, electric energy consumed when each CG cell is enabled by giving a weight value may be compensated to correspond to a circuit size.

A selecting (filtering) method may be embodied with a method of using only a signal selected by a reference determined by a user among CGEN signals. In a case in which the selecting (filtering) method is used, for example, only when a size of a circuit in which a CG cell drives is greater than a defined reference, the selecting (filtering) method may be set to use upon defining a power state.

Finally, a grouping method may be embodied to define a power state by grouping in a sub-module unit in which a user defines by grouping a CGEN signal or by grouping similar CGEN signals through circuit analysis.

According to this disclosure, by independently or complexly applying such three methods, CGEN information can be processed and thus an efficient power state can be defined.

FIG. 12 is a diagram illustrating a method of defining a power state by giving a weight value according to an exemplary embodiment of this disclosure.

In general, the number of registers that can supply a clock in a clock gating cell is limited to 32 or less due to a fan-out problem. Further, in order to obtain a power decrease effect against additional consumption power by adding a clock gating cell, three or more registers should be controlled. That is, one clock gating cell may supply a clock to at least 3 to 32 registers.

A weight of consumption power may be changed according to the number of registers in which a clock gating cell controls and a size of a circuit connected later. Therefore, a weight value may be given in consideration of a size of a circuit in which a CGEN signal drives.

FIG. 12a illustrates a case in which the number of drive FFs at CGEN 0 is 8, the number of drive FFs at CGEN 1 is 16, the number of drive FFs at CGEN 2 is 24, and the number of drive FFs at CGEN 3 is 32.

In this case, before giving a weight value, as shown in 1230, the CGEN number is only two and it may be defined with the same power state.

However, when the number of drive FFs is 16 or more, if setting a weight value is set to 2, as shown in 1240, the number of CGENs may be separated to 2, 3, and 4 to be separated and defined to three power states. FIG. 12b is an illustration of modeling a power state by separating to a level 2.

Further, when the number of drive FFs is 16 or more, a weight value is set to 2, and when the number of drive FFs is 24 or more, a weight value is set to 4, and as shown in 1250, the number of CGENs may be separated to 3, 4, 5, 6, and 7 to be separated and defined to five power states.

When a power level is divided into ⅔-level by giving a weight value, a result having improved accuracy is obtained, as shown in a below table.

|  | No weight | 2-level weight | 4-level weight |
|---|---|---|---|
| Power state number | 10 | 13 | 18 |
| Average of error rate | 17.0% | 15.5% | 8.1% |
| The number of −5% | 12 | 11 | 23 |
| The number of −10% | 17 | 19 | 26 |
| The number of −20% | 25 | 26 | 30 |

Referring again to FIG. 3, operation 340 generates a second power state in consideration of a state from a first power state in which the power state defining unit 240 defines to a power state in which the modeling unit 250 is not defined. A detailed illustration of operation 340 is shown in FIG. 13.

According to the present exemplary embodiment, when a power state is defined with only the CGEN number, not a combination of the number of cases of a CGEN signal, a power model may be formed with only a power state existing at a corresponding scenario based on a previously defined user scenario. Therefore, all cases in which a user scenario is added or changed cannot be covered.

FIG. 13 is a block diagram illustrating a method of generating a power model of an uncharacterized power state (second power state) using a characterized power state (first power state).

This may follow a method of estimating using a value of two adjacent power states and a method of extracting power model equation using a characterized power state. More specifically, according to the present exemplary embodiment, a second power state may be extracted using power model mathematization of a trend line or a method of interpolation/extrapolation using information of a first power state.

When the above method is inappropriate, by adding a new scenario and additionally extracting a power state, a power model can be compensated.

Referring again to FIG. 3, by measuring a power consumption value of a power state extracted at operation 350, power can be estimated.

FIG. 14 is a graph comparing a result that generates a power model according to an exemplary embodiment of this disclosure and a result that generates a power model using a conventional use tool. As shown in FIG. 13, it can be seen that both generate a similar pattern with an error within 5%.

FIG. 15 is a graph comparing a result that generates a power model by defining a power state with the number of CGEN according to an exemplary embodiment of this disclosure and a result that generates a power model by defining a power state with a combination of the number of cases of a signal of CGEN in the conventional art.

As shown in FIG. 15, both generate a similar pattern with an error within average 5%. However, as described above, according to this disclosure, a modeling time can be largely shortened.

Although exemplary embodiments of this disclosure have been described in detail hereinabove, it should be clearly understood that many variations and modifications of the basic inventive concepts herein described, which may appear to those skilled in the art, will still fall within the spirit and scope of the exemplary embodiments of this disclosure as defined in the appended claims.

The invention claimed is:

1. A method to model power consumption of an integrated circuit, the method comprising:
   obtaining information about clock gating enable signals of the integrated circuit;
   determining a modeling level from between a first model and a second model using a change rate of a number of the clock gating enable signals, wherein the modeling level is set to the first model if the change rate is less than a preset value and set to the second model if the change rate is greater than the preset value;
   extracting a power state according to the modeling level and the number of the clock gating enable signals; and
   modeling power consumption in the power state, wherein modeling the power consumption in the power state comprises:
      for the modeling level set to the first model:
         identifying a segment of cycles that the number of the clock gating enable signals are maximum and the integrated circuit is in an active state and a segment of cycles that the number of the clock gating enable signals are a minimum and the integrated circuit is in an inactive state;
         calculating a first average value of power consumption for the maximum segment based on an average value of the number of the clock gating enable signals in the active state and a second average value of power consumption for the minimum segment based on an average value of the number of the clock gating enable signals in the inactive state; and
         generating an estimation of a power consumption value for a segment other than the maximum segment or the minimum segment using the first and second average values; and
      for the modeling level set to the second model, extracting the power state according to the number of the clock gating enable signals and modeling the power consumption by measuring a power value in each of the power states.

2. The method of claim 1, wherein modeling the power consumption in the power state comprises giving a weight value to the number of the clock gating enable signals according to a size of a circuit in which the clock gating enable signals drive.

3. The method of claim 1, wherein modeling the power consumption in the power state comprises filtering if a size of a circuit in which the clock gating enable signals drive is smaller than a preset reference size.

4. The method of claim 1, wherein modeling the power consumption in the power state comprises grouping the clock gating enable signals and extracting the power state according to a grouping number.

5. The method of claim 1, wherein modeling the power consumption in the power state comprises:
- extracting a first power state according to the number of the clock gating enable signals;
- generating an undefined second power state using the first power state; and
- modeling the power consumption in the first power state and the second power state.

6. The method of claim 1, wherein the clock gating enabled signals are generated in a logic cone of a front end portion of a clock gating cell.

7. The method of claim 1, wherein the clock gating enabled signals are controlled by a logic cone of a clock gating cell in response to receiving an input signal.

8. A power consumption modeling apparatus of an integrated circuit, the apparatus comprising:
- a signal extracting unit configured to obtain information about a clock gating enable signals of the integrated circuit;
- a modeling unit configured to determine a modeling level from between a first model and a second model using a change rate of a number of the clock gating enable signals and model a power consumption in a power state extracted by a power state defining unit, wherein the modeling level is set to the first model if the change rate is less than a preset value and set to the second model if the change rate is greater than the preset value; and
- the power state defining unit configured to extract the power state according to the modeling level and the number of the clock gating enable signals,
- wherein the modeling unit is further configured to:
  - for the modeling level set to the first model:
    - identify a segment of cycles that the number of the clock gating enable signals are a maximum and the integrated circuit is in an active state and a segment of cycles that the number of the clock gating enable signals are a minimum and the integrated circuit is in an inactive state;
    - calculate a first average value of power consumption for the maximum segment based on an average value of the number of the clock gating enable signals in the active state and a second average value of power consumption for the minimum segment based on an average value of the number of the clock gating enable signals in the inactive state; and
    - generate an estimation of a power consumption value for a segment other than the maximum segment or the minimum segment using the first and second average values; and
  - for the modeling level set to the second model, extract the power state according to the number of the clock gating enable signals and model the power consumption by measuring a power value in each of the power states.

9. The apparatus of claim 8, wherein the power state defining unit is configured to provide a weight value to the number of the clock gating enable signals according to a size of a circuit in which the clock gating enable signals drive.

10. The apparatus of claim 8, wherein the power state defining unit is configured to perform filtering if a size of a circuit in which the clock gating enable signals drive is smaller than a preset reference size.

11. The apparatus of claim 8, wherein the power state defining unit is configured to group the clock gating enable signals and extract a power state according to a grouping number.

12. The apparatus of claim 8, wherein the power state extracting unit is configured to extract a first power state according to the number of the clock gating enable signals and generate an undefined second power state using the first power state, and
wherein the modeling unit is configured to model power consumption in the first power state and the second power state.

13. The apparatus of claim 8, wherein the clock gating enabled signals are generated in a logic cone of a front end portion of a clock gating cell.

14. The apparatus of claim 8, wherein the clock gating enabled signals are controlled by a logic cone of a clock gating cell in response to receiving an input signal.

* * * * *